United States Patent [19]

Yamaguchi

[11] 4,281,631
[45] Aug. 4, 1981

[54] EXHAUST GAS RECIRCULATION AND IDLE SPEED CONTROL DEVICE

[75] Inventor: Hiroshi Yamaguchi, Yokohama, Japan

[73] Assignee: Nissan Motor Company, Limited, Yokohama, Japan

[21] Appl. No.: 100,636

[22] Filed: Dec. 5, 1979

[30] Foreign Application Priority Data

Dec. 6, 1978 [JP] Japan .............................. 53-149930
Dec. 8, 1978 [JP] Japan .............................. 53-151010

[51] Int. Cl.³ ...................... F02M 25/06; F02M 3/00
[52] U.S. Cl. ............................... 123/571; 123/339
[58] Field of Search ............................ 123/571, 339

[56] References Cited

U.S. PATENT DOCUMENTS

| | | |
|---|---|---|
| 4,163,282 | 7/1979 | Yamada et al. ............... 123/571 |
| 4,164,032 | 8/1979 | Nohira et al. ................. 123/571 |
| 4,210,112 | 7/1980 | Nakamura et al. ............ 123/571 |
| 4,233,947 | 11/1980 | Abo ............................... 123/571 |
| 4,237,838 | 12/1980 | Kinugawa et al. ............. 123/339 |

FOREIGN PATENT DOCUMENTS

| | | | |
|---|---|---|---|
| 52-47139 | 4/1977 | Japan ............................... | 123/339 |
| 54-137521 | 10/1979 | Japan ............................... | 123/571 |
| 54-155317 | 12/1979 | Japan ............................... | 123/339 |
| 2035453 | 6/1980 | United Kingdom ............ | 123/571 |

*Primary Examiner*—Wendell E. Burns

*Attorney, Agent, or Firm*—Schwartz, Jeffery, Schwaab, Mack, Blumenthal & Koch

[57] ABSTRACT

An exhaust gas recirculation and idle speed control device including an exhaust gas recirculation control valve responsive to negative pressure for controlling amounts of exhaust gas recirculation, an idle speed control valve responsive to negative pressure for controlling intake air flow rate when idling, a solenoid valve for regulating intake negative pressure, a change-over valve adapted to be changed to supply the negative pressure regulated by the solenoid valve to any one of the exhaust gas recirculation and idle speed control valves and a control circuit for generating signals depending upon engine operating parameters for controlling the solenoid valve and for changing the change-over valve to the idle speed control valve side when a throttle valve is closed and changing the change-over valve to the exhaust gas recirculation control valve side at the time other than when the throttle valve is closed according to the invention comprises a timer circuit in the control circuit to provide a constant delay time determined by the timer circuit in changing the change-over valve, during which the exhaust gas recirculation control valve is completely closed and thereafter the change-over valve is changed to the idle speed control valve side, thereby controlling exhaust gas recirculation and idle speed by means of only one solenoid valve and preventing malfunctions in changing the exhaust gas recirculation and idle speed controls.

7 Claims, 7 Drawing Figures

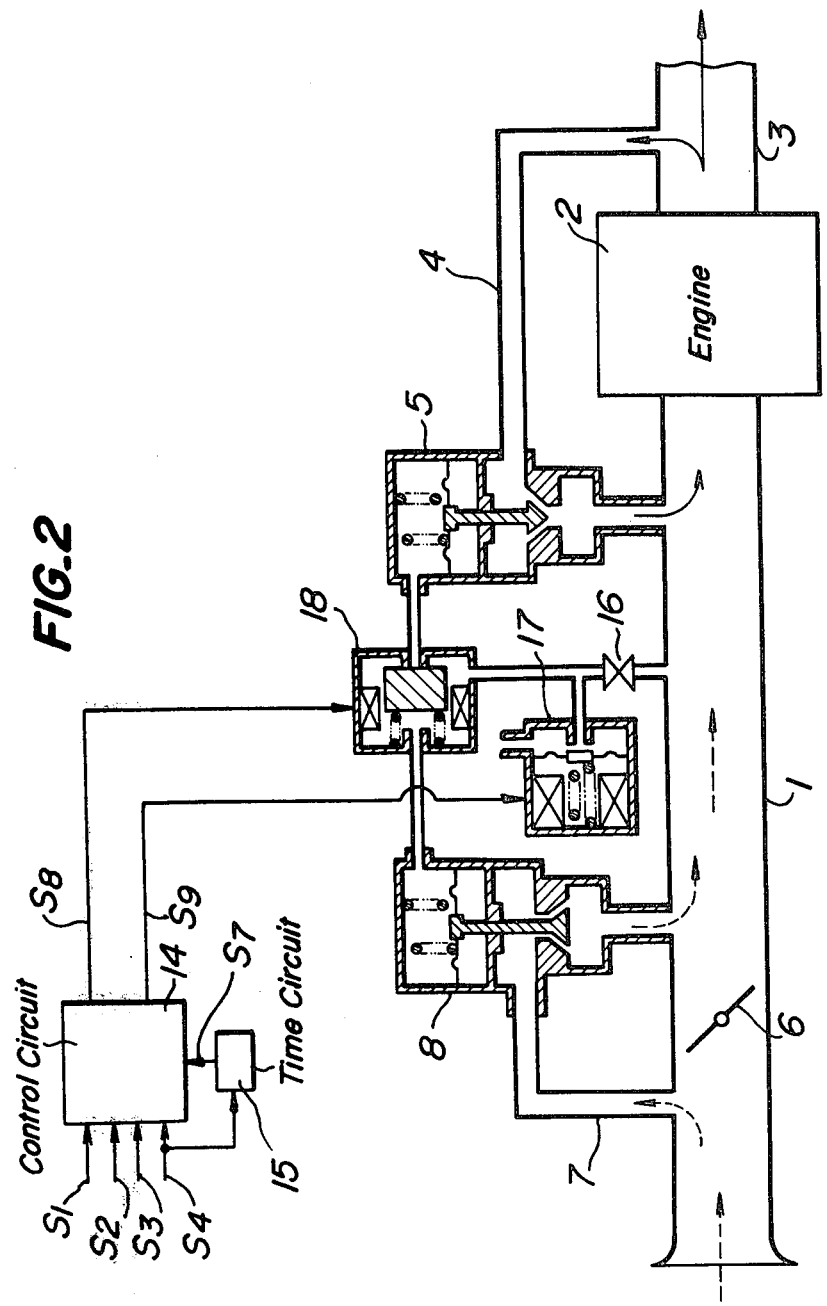

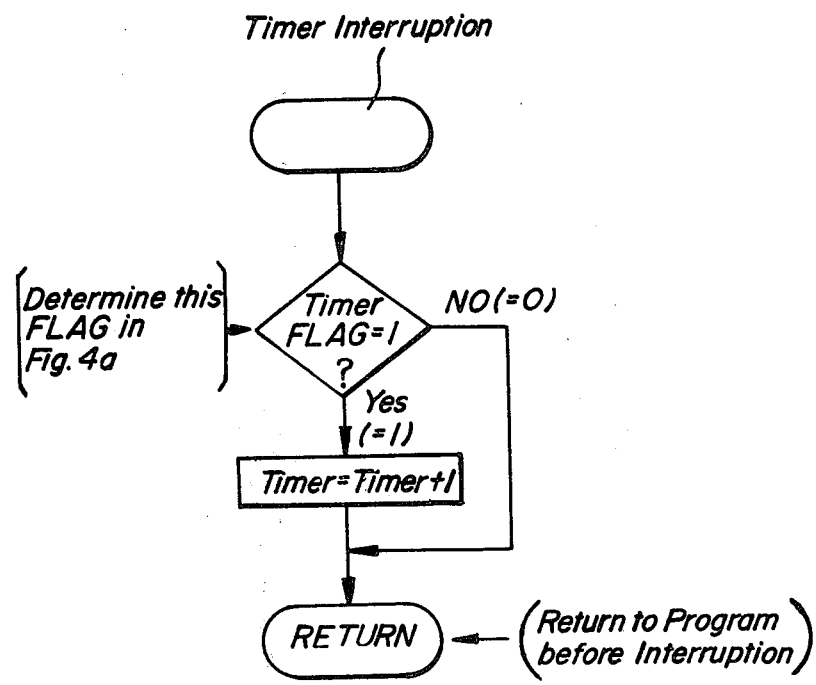

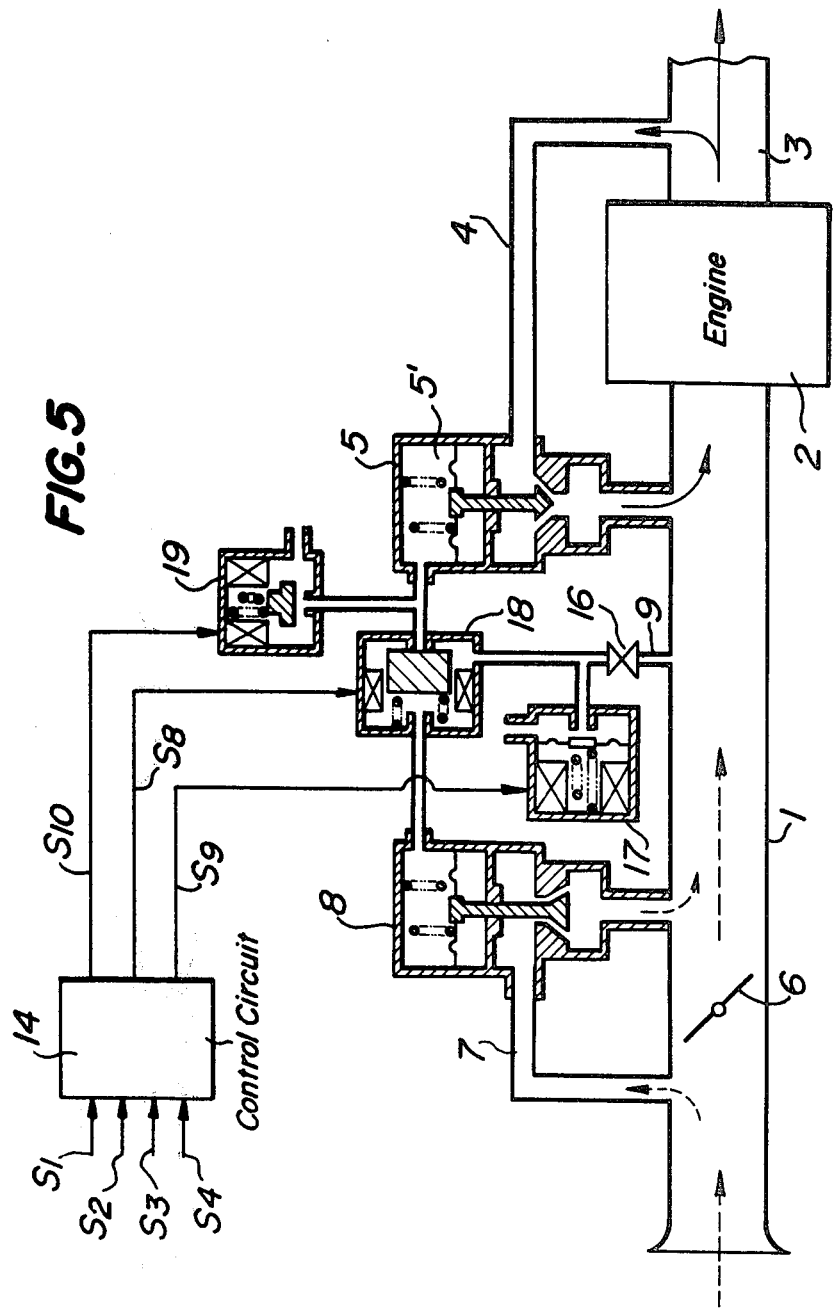

EXHAUST GAS RECIRCULATION AND IDLE SPEED CONTROL DEVICE

BACKGROUND OF THE INVENTION

1. Field of the Invention

The present invention relates to a device for controlling amounts of exhaust gas recirculation and idle speeds of an internal combustion engine.

2. Description of the Prior Art

The exhaust gas recirculation system (which is referred to as "EGR" hereinafter) is a method of purifying exhaust gases of internal combustion engines, which intends to re-introduce a part of the exhaust gas into an intake air flow to restrain temperature rise in a combustion chamber, thereby reducing the generation of nitrous oxides (NOx).

Recently, moreover, it has been required to control idling (no-load) revolutions precisely in order to improve the purification of the exhaust gases and to decrease the fuel consumption. (The idle speed control is referred to as "ISC" hereinafter.)

In carrying out the above EGR and ISC, the recirculation and idle speed have been separately controlled. Referrring to FIG. 1, intake air is supplied through an intake air tube 1 to an engine 2 as shown in broken line arrows. A part of the exhaust gas is re-introduced into the intake air tube 1 through an EGR tube 4 branched off an exhaust tube 3 and an EGR control valve 5 provided in the EGR tube 4 as shown in solid line arrows.

On the other hand, upstream and downstream sides of a throttle valve 6 provided in the intake air tube 1 are connected by a bypass 7 including an ISC control valve 8.

Intake negative pressure downstream of the throttle valve 6 is withdrawn through a negative pressure tube 9 and fed through constant pressure valves 10 and 11 to the EGR control valve 5, solenoid valve 12, ISC control valve 8 and solenoid valve 13.

The solenoid valves 12 and 13 close and open in response to control signals $S_5$ and $S_6$ from a control circuit 14 to shut off the negative and atmospheric pressures alternately. Accordingly, the negative pressures supplied to the EGR control valve 5 and ISC control valve 8 vary to change open areas of these control valves, thereby enabling the amounts of EGR and intake air flow rate when idling to be controlled.

The control circuit 14 consists of, for example, a micro computer, to which various signals corresponding to the operating parameters of the engine are supplied, such as intake air flow signals $S_1$, engine revolution signals $S_2$, engine temperature signals $S_3$, throttle valve open area signals $S_4$ and the like. Then the control circuit effects required arithmetic processes for these signals to generate control signals $S_5$ or $S_6$ for optimum amounts of EGR or intake air flow rate.

With the hitherto used devices, as above described the EGR and ISC are controlled in completely separate systems each having one solenoid valve. As these solenoid valves are required to close and open exactly in high responsibility according to given control signals, they become inevitably precise and expensive to increase the cost of the entire device.

In order to solve this problem, a system has been proposed wherein the EGR and ISC are changed to be controlled by one solenoid. In this case, the ISC is effected only when a throttle valve is closed (when idling) and the EGR is effected only at the time other than the above time because the amount of NOx is little to an extent not requiring the EGR when idling. Therefore, there is provided with one solenoid valve and a change-over valve for supplying the negative pressure regulated by the solenoid valve to any one of the ISC and EGR control valves at the time when the throttle valve is completely closed or other than the time, thereby enabling only one solenoid valve to control the EGR and ISC.

When a throttle valve is closed to the most possible extent, there is generally a clearance between a periphery of a valve body and a wall of an intake air passage. It will be therefore understood that the expression "throttle valve is closed" used herein means the closed position of a throttle valve when idling.

With the above system, while the EGR control valve is opened when the change-over valve is changed from the EGR to ISC, the EGR control valve is kept opened, so that the EGR is effected during idling of the engine and therefore the revolutions of the engine tends to be unstable.

SUMMARY OF THE INVENTION

It is an object of the invention to provide an improved exhaust gas recirculation and idle speed control device for an internal combustion engine, which eliminates all the disadvantages of the prior art.

It is another object of the invention to provide an exhaust gas recirculation and idle speed control device, which is capable of controlling both the exhaust gas recirculation and the idle revolutions of the engine by means of only one solenoid valve.

In order to achieve the above objects, the device according to the invention comprises a timer circuit in the control circuit to provide a constant delay time determined by the timer circuit in changing from the EGR to ISC, during which an EGR control valve is completely closed and thereafter a change-over valve is changed to the position for ISC.

In a preferred embodiment of the invention, a negative pressure chamber of an EGR control valve is provided with an atmosphere relief valve to open the negative pressure chamber of the EGR control valve to the atmospher, thereby completely closing the EGR control valve when a throttle valve is closed or when idling.

The invention will be more fully understood by referring to the following detailed specification and claims taken in connection with the appended drawings.

BRIEF DESCRIPTION OF THE DRAWINGS

FIG. 2 shows an arrangement of one embodiment of an exhaust gas recirculation and idle speed control device according to the invention;

FIGS. 4a and 4b illustrate control flow charts of a control circuit used in the embodiment shown in FIG. 2; and FIG. 5 shows an arrangement of another embodiment of the device according to the invention.

DETAILED DESCRIPTION OF THE PREFERRED EMBODIMENT

Figure 1:
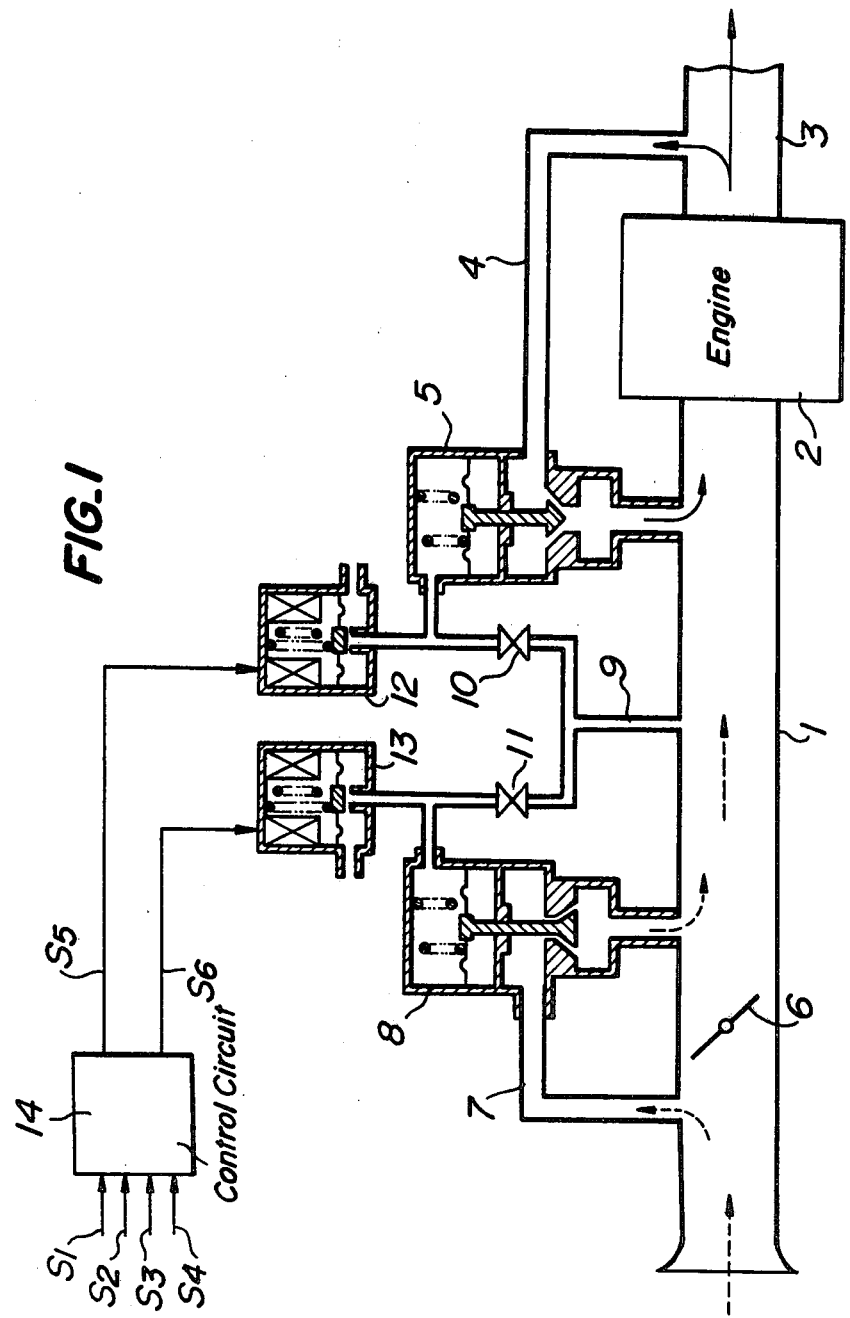
FIG. 1 illustrates an arrangement of an exhaust gas recirculation control device and an idle speed control device of the prior art as mentioned above.
Figure 3A:
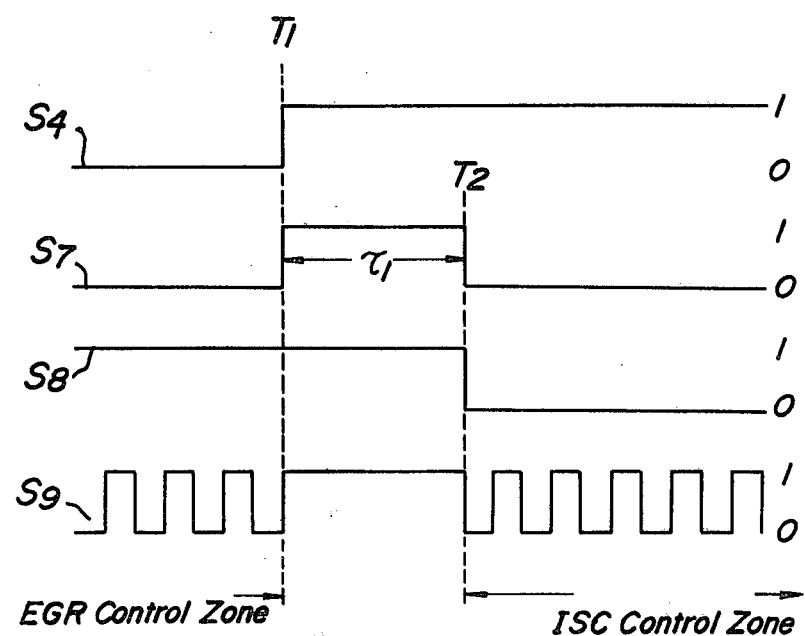
FIGS. 3a and 3b illustrate wave forms of signals used in the embodiment shown in FIG. 2.
Figure 3B:
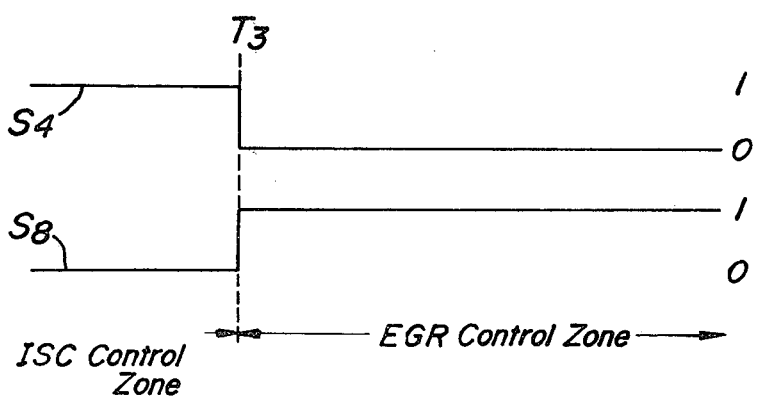

FIG. 2 illustrates one embodiment of the device according to the invention, wherein like components have been designated by the same reference numerals as in FIG. 1. FIGS. 3a and 3b show wave forms of signals shown in FIG. 2 for changing from EGR to ISC and from ISC to EGR, respectively. $S_4$ and $S_7$-$S_9$ in FIG. 3 correspond of course the same references in FIG. 2.

Referring to FIG. 2, a timer circuit 15 produces the continuous signals $S_7$ during a determined delay time $\tau_1$ starting from a time $T_1$ when the throttle open signal $S_4$ indicates the close of the throttle valve. For example, a signal "1" of the throttle open signal $S_4$ indicates the close of the throttle valve, while a signal "0" indicates the other throttle valve condition.

The device further comprises a constant pressure valve 16, a solenoid valve 17 and a change-over valve 18. The negative pressure regulated by the solenoid valve 17 is supplied through the change-over valve 18 to any one of the EGR control valve 5 and ISC control valve 8. The change-over valve 18 is changed to provide the negative pressure to the EGR control valve 5 when the change-over signal $S_8$ from the control circuit 14 is "1" or to provide the negative pressure to the ISC control valve 8 when the change-over signal $S_8$ is "0". The change-over signal $S_8$ continues to be "1" during the delay time $\tau_1$ even if the signal $S_4$ has changed from "0" to "1" but the change-over signal $S_8$ changes from "1" to "0" at a moment $T_2$ when the signal $S_7$ changed from "1" to "0".

The control signal $S_9$ in a pulse signal of repetition type produced in the control circuit 14 corresponding to various operating parameters of the engine and continues to be "1" during the delay time $\tau_1$ during which its duty factor is 100%.

Accordingly, as the solenoid valve 17 is fully opened during the delay time $\tau_1$ when changing from the EGR to ISC, the negative pressure applied to the EGR control valve 5 becomes zero or the atmospheric pressure, so that the EGR control valve 5 is completely closed and thereafter the change-over valve 18 is changed to ISC, with the result that the EGR is completely prevented during the idling of the engine.

The delay time $\tau_1$ is sufficient to be, for example, in the order of 0.1-1 second, and therefore the delay or lost time during the changing does not adversely affect the control of the device.

In case of changing from the ISC to EGR, on the other hand, as shown in FIG. 3b, when the signal $S_4$ changes from "1" to "0" at the moment $T_3$ (the throttle valve changes from closed to opened), the signal $S_8$ changes immediately from "0" to "1" to change the change-over valve 18 so as to supply the negative pressure to the EGR control valve 5.

The timer circuit 15 may be a circuit which produces signals $S_7$ while clock pulses of a predetermined number are counted ($\tau_1$ is constant). As an alternative, the timer circuit 15 may be a circuit which produces signals $S_7$ while revolution signals of a determined number in synchronism with revolutions of the engine are counted ($\tau_1$ varies with the revolution per minute of the engine). In case of that the control circuit 14 comprises a micro computer, the timer circuit 15 may be included in the micro computer, although it is separately illustrated in FIG. 2.

Figure 4A:
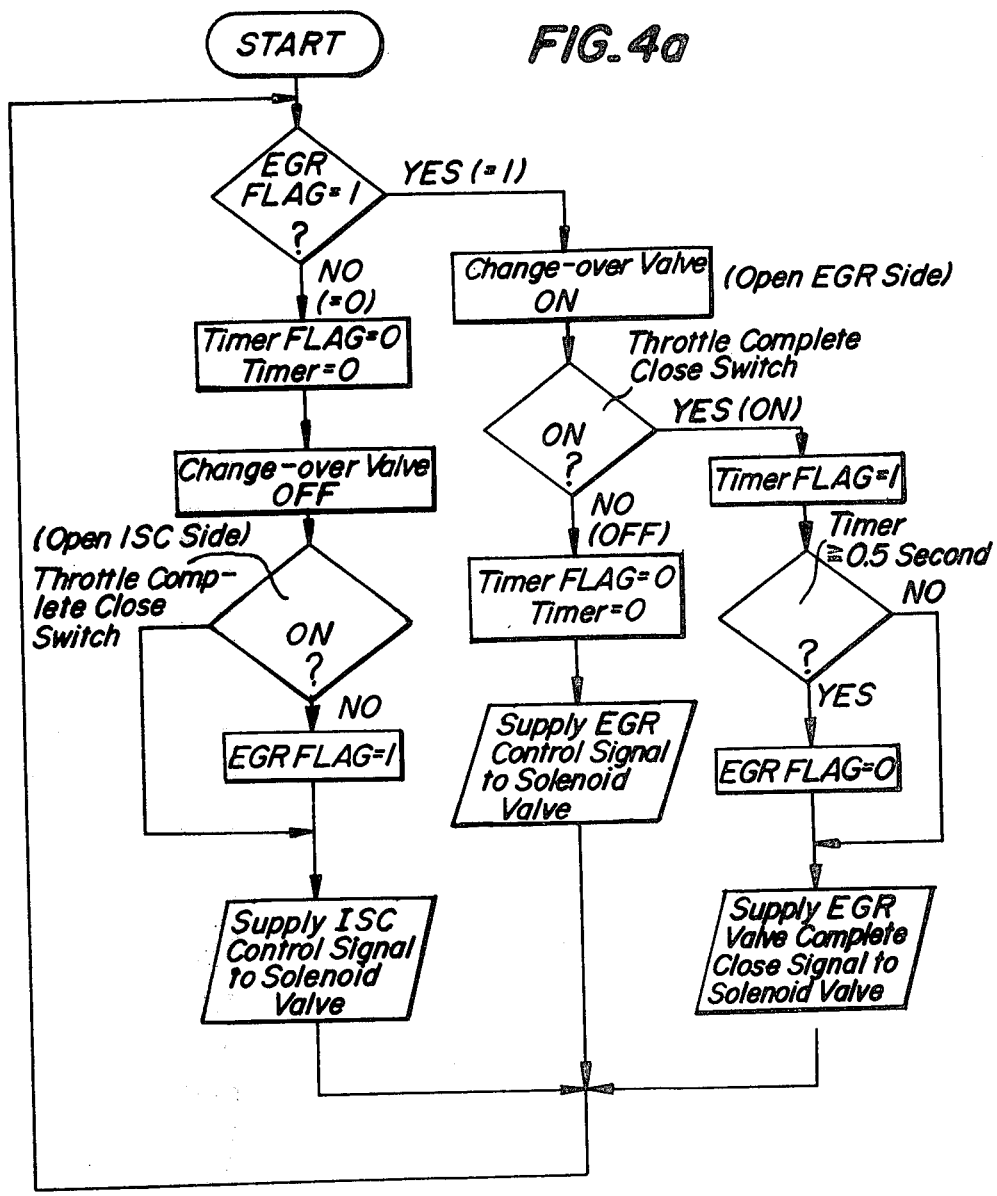

FIGS. 4a and 4b illustrate control flow charts when a micro computer is used as the control circuit 14. The flow chart shown in FIG. 4a is for generating the changeove signal $S_8$ and control signal $S_9$ and the flow chart in FIG. 4b is for the timer signal $S_7$. In FIG. 4b, for example, frequencies of clock pulses are divided to generate a pulse per 0.1 second and an interruption is effected.

FIG. 5 illustrates other embodiments of the invention, wherein like components have been designated by the same reference numerals as in FIG. 2. The device comprises an atmosphere relief valve 19 in addition to the constant pressure valve 16, solenoid valve 17 and change-over valve 18. The negative pressure regulated by the solenoid valve 17 is supplied through the change-over valve 18 to any one of the EGR and ISC control valves 5 and 8. The change-over valve 18 is controlled by change-over signals $S_8$ to be changed so as to provide the negative pressure on the ISC control valve 8 when the throttle valve 6 is closed and to provide the negative pressure to the EGR control valve 5 at the time other than the throttle valve being closed.

The atmosphere relief valve 19 is controlled by control signals $S_{10}$ and kept closed during the time other than the throttle valve being closed but is fully opened when the throttle valve is completely closed. When the atmosphere relief valve 19 is fully opened, a negative pressure chamber 5' of the EGR control valve 5 opens into the atmosphere and therefore the EGR control valve 5 is completely closed.

Accordingly, when the change-over valve 18 is changed from the EGR to ISC, the EGR control valve 5 is completely closed without fail, so that the EGR is completely prevented during the idling of the engine.

Although the atmosphere relief valve 19 is exemplarily provided in a tube connecting the EGR control valve 5 and change-over valve 18 in FIG. 5, the atmosphere relief valve 19 may be directly connected to the negative pressure chamber 5' of the EGR control valve 5.

All that is required of the atmosphere relief valve 19 is to have the closing and opening functions without requiring any high responsibility and accuracy, so that the atmosphere relief valve 19 is very inexpensive in comparison with the solenoid valve.

As can be seen from the above description, the device according to the invention can control both the EGR and ISC by means of only one expensive solenoid valve and prevents malfunctions in changing the EGR and ISC to provide an inexpensive and high performance EGR and ISC control device.

It is further understood by those skilled in the art that the foregoing description is preferred embodiments of the disclosed device and that various changes and modifications may be made in the invention without departing from the spirit and scope thereof.

What is claimed is:

1. An exhaust gas recirculation and idle speed control device for an internal combustion engine including an exhaust gas recirculation control valve responsive to negative pressure for controlling amounts of exhaust gas recirculation, an idle speed control valve responsive to negative pressure for controlling intake air flow rate when idling, a solenoid valve for regulating intake negative pressure, a change-over valve being changed to supply the negative pressure regulated by the solenoid valve to any one of said exhaust gas recirculation and idle speed control valves and a control circuit for generating signals depending upon engine operating parameters for controlling said solenoid valve and for changing said change-over valve to the idle speed control valve side when a throttle valve is closed and changing said change-over valve to the exhaust gas recirculation control valve side at the time other than when the throttle valve is closed, comprising signal generating means for generating signals for changing said change-over valve from the exhaust gas recirculation control valve side to the idle speed control valve side after a predetermined delay time has lapsed from a moment when the throttle valve was closed and signals for controlling said solenoid valve to fully open said exhaust gas recirculation control valve during said delay time.

2. An exhaust gas recirculation and idle speed control device as set forth in claim 1, wherein said signal generating means comprises a timer circuit for generating a continuous delay signal during said determined delay time and generates said signal for changing said change-over valve from the exhaust gas recirculation control valve side to the idle speed control valve side when said delay signal is changed.

3. An exhaust gas recirculation and idle speed control device as set forth in claim 1, wherein during said determined delay time said solenoid valve is fully opened to provide atmospheric pressure to said exhaust gas recirculation control valve which is thus completely closed and thereafter said change-over valve is changed.

4. An exhaust gas recirculation and idle speed control device as set forth in claim 1, wherein said throttle valve is changed from the closed to opened position, said change-over valve is immediately changed from the idle speed control side to the exhaust gas recirculation side.

5. An exhaust gas recirculation and idle speed control device as set forth in claim 2, wherein said timer circuit produces said signal while clock pulses of a determined number are counted.

6. An exhaust gas recirculation and idle speed control device as set forth in claim 2, wherein said timer circuit produces said signal while revolution signals of a determined number in synchronism with revolutions of the engine are counted.

7. An exhaust gas recirculation and idle speed control device as set forth in claim 1, wherein said device comprises an atmosphere relief valve connected to a negative pressure chamber of said exhaust gas recirculation control valve and means for generating a signal for fully opening said atmosphere relief valve when said throttle valve is closed thereby providing atmospheric pressure to said negative pressure chamber when said throttle valve is closed to completely close said exhaust gas recirculation control valve.

* * * * *